(12) United States Patent
Cox et al.

(10) Patent No.: US 10,828,714 B1
(45) Date of Patent: Nov. 10, 2020

(54) ARC WELDING SYSTEM

(71) Applicant: LIBURDI ENGINEERING LIMITED, Dundas (CA)

(72) Inventors: Brian Michael Cox, Oakville (CA); Robert Joseph Pistor, Burlington (CA); Emanuel Bruno Ferreira Dos Santos, Waterdown (CA)

(73) Assignee: LIBURDI ENGINEERING LIMITED, Ontario (CA)

( * ) Notice: Subject to any disclaimer, the term of this patent is extended or adjusted under 35 U.S.C. 154(b) by 386 days.

(21) Appl. No.: 15/725,165

(22) Filed: Oct. 4, 2017

(51) Int. Cl.
*B23K 9/10* (2006.01)
(52) U.S. Cl.
CPC .................................. *B23K 9/1062* (2013.01)
(58) Field of Classification Search
CPC .......... B23K 9/09; B23K 9/091; B23K 9/092; B23K 9/093; B23K 9/095; B23K 9/1006; B23K 9/1062
See application file for complete search history.

(56) References Cited

U.S. PATENT DOCUMENTS

| 4,301,355 A * | 11/1981 | Kimbrough | B23K 9/091 |
| | | | 219/130.31 |
| 2008/0237196 A1* | 10/2008 | Yamazaki | B23K 9/092 |
| | | | 219/74 |
| 2015/0041448 A1* | 2/2015 | O'Donnell | B23K 9/1043 |
| | | | 219/130.1 |

OTHER PUBLICATIONS

"Metal Beam Automatic Welding System", Dimetrics, Inc., 2 pages.

* cited by examiner

*Primary Examiner* — Brian W Jennison
(74) *Attorney, Agent, or Firm* — Lewis Roca Rothgerber Christie LLP

(57) ABSTRACT

An arc welder with current and voltage control. The welder includes a current control loop for sensing and controlling the arc current. In an operating state, a voltage control loop senses an average arc voltage and controls it to be equal to a setpoint, by sending a current control signal to the current control loop, the current control signal being a constant frequency, variable duty cycle square wave. When starting a weld, the welder operates for an initial time interval in an arc-starting state, in which a constant frequency, constant duty cycle square wave is sent to the current control loop as a current control signal. In some embodiments the weld head position is controlled based on a ratio of the average arc voltage to the average arc current, and the frequency of the current control signal is adjusted to be synchronized with droplet detachment from the feed wire.

22 Claims, 9 Drawing Sheets

ARC WELDING SYSTEM

FIELD

One or more aspects of embodiments according to the present invention relate to arc welding systems, and more particularly to a system for producing high quality welds in various weld positions.

BACKGROUND

In gas metal arc welding processes, a feed wire may act as both a supply of filler metal and as an electrode for the arc. A shield gas may be provided, e.g., within an appropriate shroud, in the arc environment.

One metal transfer mode is known in the art as "droplet spray transfer." This type of transfer may occur at high current density, and is characterized by fine molten metal droplets being ejected from the end of the feed wire as it is fed toward the work piece. These droplets are transferred across the arc and impinge on a molten puddle which is formed in the work piece.

If the weld is "out of position", e.g., overhead or on a vertical surface, and the weld puddle becomes sufficiently large, gravity may cause molten metal in the weld puddle to flow or drip out of the weld. This may be avoided by reducing the welding current, and, accordingly, the weld puddle size, but such a reduction in current may cause droplet spray transfer to cease; instead of filler metal being transferred to the weld by droplet spray transfer, larger metal droplets may form on the tip of the feed wire, and be transferred to the weld only when they become sufficiently large to detach from the tip by action of gravity. The larger drops may splash on impact into the weld, and the weld may cool significantly during the relatively long time between the transfer of successive drops. Further, a relatively low average arc power may be used in this mode. This may result in poor weld quality, with, e.g., significant spatter.

At still lower currents the welding process may operate in a short-circuiting arc process, in which an arc is formed each time the electrode melts and a gap is stablished between the wire tip and the weld puddle, and extinguished when a drop is being transferred from the electrode and flows into the weld. Weld quality may also be poor in this process, with excessive spatter.

Thus, there is a need for a system and method for providing weld puddle control in an arc welder operating in spray-transfer mode.

SUMMARY

According to an embodiment of the present invention there is provided an arc welding system for forming and maintaining a welding arc, the system including: a current controller for performing closed-loop control of an arc current, the current controller having a crossover frequency of at least 10 Hz; and a voltage controller for performing, in an operating state of the system, closed-loop control of an arc voltage by measuring the arc voltage with an analog-to-digital converter, and providing, to the current controller, a square wave current control signal having a variable duty cycle, the variable duty cycle being based on the measured arc voltage.

According to an embodiment of the present invention there is provided an arc welding system for forming and maintaining a welding arc, the system including: a current controller for performing closed-loop control of an arc current, the current controller having a crossover frequency of at least 10 Hz; and a voltage controller for performing, in an operating state of the system, closed-loop control of an arc voltage by measuring the arc voltage with an analog-to-digital converter, and providing, to the current controller, a square wave current control signal having a variable duty cycle, the variable duty cycle being based on the measured arc voltage.

In one embodiment, the system includes a droplet detection circuit for detecting a change, in the arc voltage, corresponding to droplet detachment from a feed wire, wherein the voltage controller includes a square wave generator to dynamically adjust a low current portion of the square wave current control signal, in response to the change in the arc voltage, to achieve one droplet per cycle of the square wave current control signal.

In one embodiment, the square wave current control signal has a constant frequency.

In one embodiment, the current controller has a crossover frequency of at least 8 kHz.

In one embodiment, the system includes a welding head, and a welding head position controller for: calculating a ratio of an arc voltage characteristic and an arc current characteristic, and controlling, based on the ratio, a position of the welding head with respect to a weld puddle.

In one embodiment, the voltage controller has a gain inversely proportional to frequency, over a range of frequencies.

In one embodiment, the system includes a state-control circuit for disabling the voltage controller in an arc-starting state of the system.

According to an embodiment of the present invention there is provided a method for operating an arc welder, the method including: sensing an arc current and controlling the arc current to follow, with a current control loop, a current control signal, sensing an average arc voltage and controlling, with a voltage control loop, the average arc voltage to equal a setpoint value, the controlling of the average arc voltage including: providing, to the current control loop, as the current control signal, a square wave having a variable duty cycle.

In one embodiment, the method includes sensing wire droplet detachment from a feed wire and controlling, by this detection, the duration of low current portions of the square wave to achieve one droplet per cycle of the square wave.

In one embodiment, the square wave has a constant frequency.

In one embodiment, the method includes, during a first interval of time, before controlling, with the voltage control loop, the average arc voltage to equal a setpoint value: controlling the arc current to follow a square wave current control signal having a constant frequency and a constant duty cycle.

According to an embodiment of the present invention there is provided an arc welding system for forming and maintaining a welding arc, the system including: a current source for providing and controlling an arc current; and a closed-loop voltage controller for: measuring at least two values of an arc voltage; calculating, from the measured values, an average arc voltage; and providing, at a voltage controller output, a square wave current control signal, the voltage controller output being connected, in an operating state, to a control input of the current source, the square wave current control signal having a variable duty cycle, the variable duty cycle based on the average arc voltage, each cycle of the square wave having a high current portion and a low current portion; wherein the measuring of at least two values of the arc voltage includes sampling the arc voltage during a high current portion and sampling the arc voltage during a low current portion, and wherein the calculating of the average arc voltage includes digitally calculating an average of a plurality of first voltage values V*, each first voltage value being calculated according to: $V^* = V_H \times D + V_L \times (1-D)$, wherein $V_H$ is a voltage sampled during a high current portion, $V_L$ is a voltage sampled during a low current portion, and D is the duty cycle.

In one embodiment, the variable duty cycle is further based on a change in the arc voltage corresponding to droplet detachment from a feed wire, and wherein the square wave current control signal has a frequency based on the average arc voltage and on the change in the arc voltage corresponding to droplet detachment from the feed wire.

In one embodiment, the square wave current control signal has a constant frequency.

In one embodiment, in an arc-starting state, the voltage controller is disconnected from the control input of the current source, and a square wave generator for generating a constant frequency, constant duty cycle square wave is connected to the control input of the current source.

In one embodiment, the measuring of at least two values of the arc voltage includes: receiving a voltage sample value from an analog to digital converter; discarding the voltage sample value if a sampling time associated with the voltage sample value is within a dead time interval of a plurality of dead time intervals in each cycle of the square wave; and storing the value if a sampling time associated with the voltage sample is not within any dead time interval of the plurality of dead time intervals in each cycle of the square wave.

In one embodiment, the plurality of dead time intervals includes: a first time interval beginning at the transition from a low current portion to a high current portion immediately following the low current portion; and a second time interval beginning at the transition from a high current portion to a low current portion immediately following the low current portion.

In one embodiment, the providing, at the voltage controller output, of a square wave current control signal includes calculating a voltage error signal as a difference between the average arc voltage and a voltage setpoint value.

In one embodiment, the providing, at the voltage controller output, of a square wave current control signal further includes: multiplying the error signal by a gain coefficient to form a scaled error signal; and integrating the scaled error signal to form a tentative on time.

In one embodiment, the providing, at the voltage controller output, of a square wave current control signal further includes: setting an on time equal to a maximum on time if the tentative on time is greater than the maximum on time; setting the on time equal to a minimum on time if the tentative on time is less than the minimum on time; and setting the on time equal to the tentative on time if the tentative on time is: not less than the minimum on time; and not greater than the maximum on time.

In one embodiment, the minimum on time is the greater of: a specified internal value which cannot be changed by an operator, and a user-selectable value.

In one embodiment, the maximum on time is 1/f minus a specified internal value which cannot be changed by an operator, wherein f is a frequency of the square wave current control signal.

In one embodiment, the length of the first time interval is equal to the on time; and the sum of: the length of the first time interval, and the length of the second time interval is equal to the reciprocal of a frequency of the square wave current control signal.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of an arc welding system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
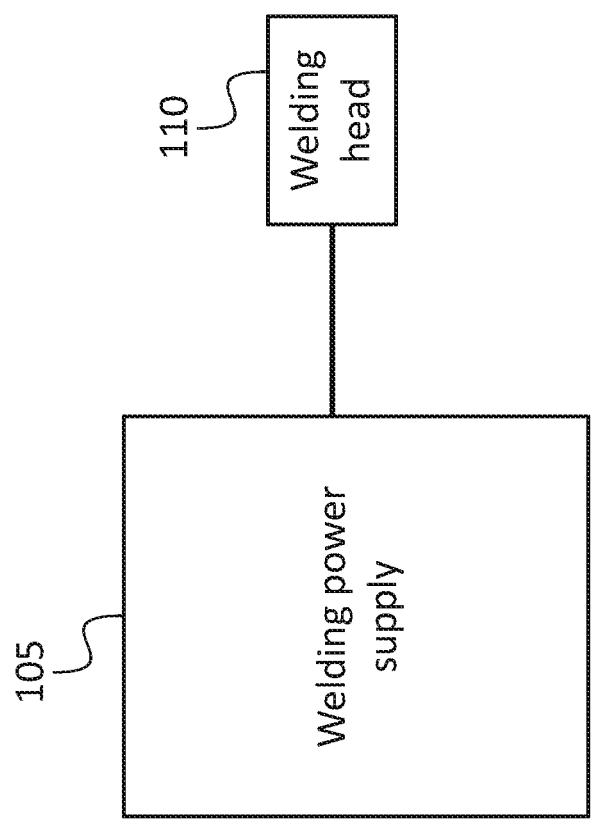
FIG. 1 is a top-level block diagram of a welding system, according to an embodiment of the present invention.

Referring to FIG. 1, in one embodiment a gas metal arc welding (GMAW) system may include a welding power supply 105 and a welding head 110 connected to the welding head by a cable. The welding head may be located at the weld, and may include a spool of feed wire and a conductive contact tip, through which the feed wire runs, for delivering current to the feed wire. Feeding of the wire into the weld may be accomplished by a wire feed mechanism driven by a wire feed servomotor. One or more positioning mechanisms for controlling the position of the contact tip and other elements of the welding head with respect to the workpiece may be part of the welding head or may support and position the welding head. Welding current may be supplied to the welding head through one or more suitable wires in the cable. The cable may also include wires to carry various sensing and control signals between the welding power supply and the welding head. The welding power supply 105 may include circuits for providing and controlling the weld current, and for controlling the wire feed mechanism and the positioning mechanisms. The welding power supply may also control the flow of shield gas and of coolant (if coolant is used) and it may provide a user interface for an operator to set up, monitor, and control the welding operation.

Figure 2:
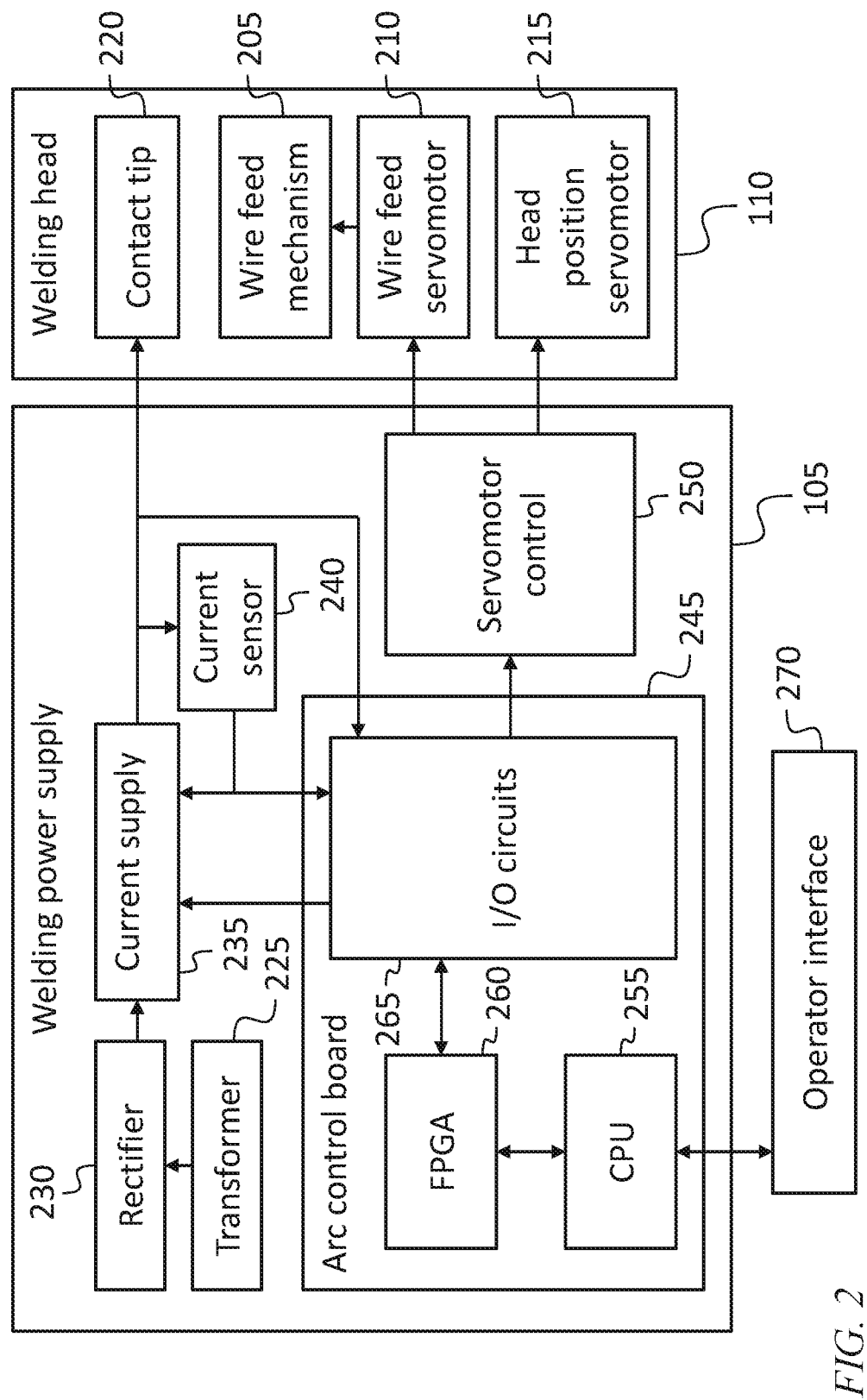
FIG. 2 is a block diagram of a welding system, according to an embodiment of the present invention.

Referring to FIG. 2, in one embodiment the welding head includes a wire feed mechanism 205 driven by a wire feed servomotor 210, and one or more head position servomotors 215, for controlling, for example, the distance of the contact tip 220 from the weld. The welding power supply may include a transformer 225, a rectifier 230, a current supply 235, a current sensor 240, an arc control board 245 and a servomotor control board 250.

The current supply 235 may be a voltage-controlled current source that receives a control signal (e.g., a control voltage) at a control input, receives welding power from the transformer and rectifier, and provides the welding current to the arc. In one embodiment, the current supply includes a buck converter (or "series switch") operating at a first frequency, with a variable duty cycle, and the current supply includes a feedback control loop, or "current control" loop, for controlling the buck converter duty cycle, in response to a current control signal received at the control input and to a current telemetry signal produced by an external current sensor, or "current transducer". An operational amplifier within the current source provides a signal that represents the error between the commanded current (the current control signal) and actual current (the current telemetry signal). The output of the operational amplifier is fed into a pulse width modulator chip that controls the buck converter duty cycle.

The servomotor control board 250 may include circuits for sensing the velocity of each of a plurality of servomotors, and for feeding back to respective drive currents so that each motor follows a velocity setpoint, or "command". The velocity commands may be provided by the arc control board 245.

The control board may include a central processing unit (CPU) 255 and a field-programmable gate array (FPGA) 260, that together may provide various real-time control functions within the control board. The CPU may be installed on a separate board or "daughter board" mechanically supported by the control board and electrically connected to the control board by one or more connectors. In one embodiment the CPU board is a PC104 board connected to the control board through an Industry Standard Architecture (ISA) bus. The CPU may control, and receive input from, an operator interface 270, which may include a display and one or more user input devices such as a mouse and a keyboard.

The control board may receive signals, or "telemetry" from various elements of the system, and send control signals to various elements of the system, e.g., to initiate and control the arc. For example, voltage sensing wires may run from the arc control board to the ground connection (connected to the work piece) and to the contact tip; through these wires the control board may obtain a voltage telemetry signal, i.e., it may measure the voltage across the arc. The arc control board may then adjust the current control signal, to maintain a desired arc voltage.

The FPGA may be connected to other elements of the system through input and output circuits, or "I/O circuits" 265, that may include analog to digital converters and digital to analog converters. The I/O circuits may also include analog signal conditioning circuits. For example, the analog arc voltage telemetry signal may be received by a voltage sensing circuit that may include a resistive divider, a filter, and an analog to digital converter. The voltage telemetry signal received on the voltage sensing wire connected to the contact tip may be reduced by the resistive divider, filtered by an analog filter, and converted to a digital signal by an analog to digital converter. The filter may be an operational amplifier circuit implementing a Butterworth filter with a corner frequency between 1.0 kHz and 5.0 kHz. Such filtering may help to reduce noise in the analog signal. The analog to digital converter may operate at a sampling rate of about 12.5 kHz.

Figure 3A:
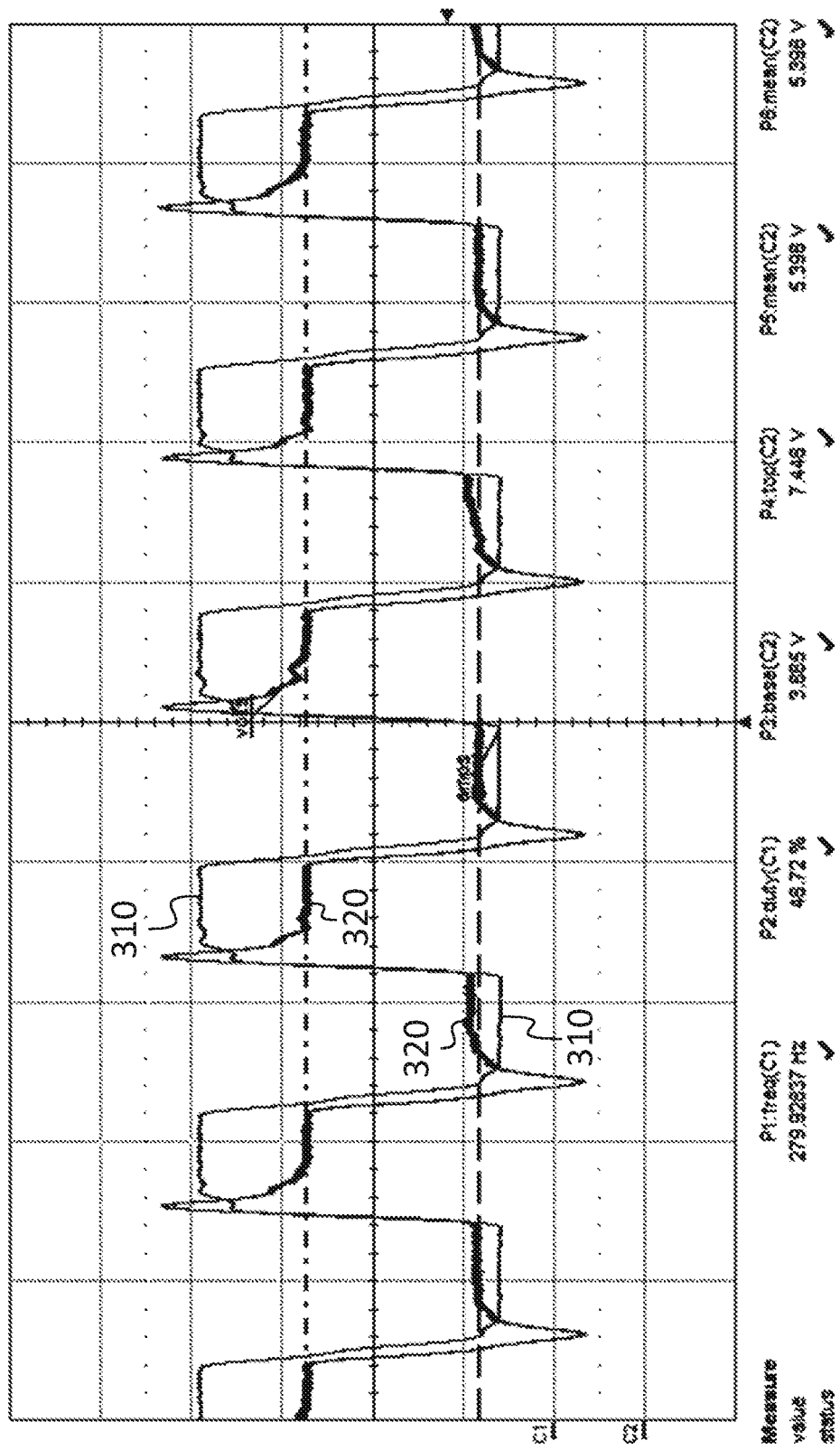
FIG. 3A is an oscilloscope display of welding waveforms, according to an embodiment of the present invention.

Referring to FIG. 3A, in one embodiment, the arc current is controlled to have a square-wave waveform (displayed, e.g., in a first oscilloscope trace 310) that alternates between a low current value and a high current value. Such operation, which may be referred to as "pulsed" operation, may result in operation in droplet spray transfer mode at considerably lower average power (and lower energy per unit of deposited metal) than in constant voltage operation. In FIG. 3A the arc voltage is displayed in a second oscilloscope trace 320. FIG. 3A was generated using a time scale of 2 milliseconds per division. The low current is selected to be just sufficient to keep the arc lit and the high current is selected to be near the maximum current the current supply is capable of producing. Without intending to be bound by any theory, it is believed that (i) this waveform produces effective droplet spray transfer during the high current portions of the waveform (with, e.g., one droplet being transferred during each of the high current portions), and prevents undue cooling (and the cold-lapping that could result) during the low current portions of the waveform, and that (ii) operating in the high current spray-transfer mode it possible to avoid the formation of an unacceptably large weld puddle. It is further believed that the high current portion promotes the melting of wire and acceleration of the droplet, while the low current portion keeps the arc lit for a period of time sufficient for the wire feeding system to provide enough wire volume for the next droplet to be formed. As such, the gap between wire tip and weld pool surface is maintained constant over time. The square wave current control signal at the control input of the current supply (and, accordingly, the waveform of the arc current) can have a frequency set in one of several ways. In some embodiments, it has a set constant frequency (that may be set or adjusted by the operator) and a duty cycle that varies under the control of the voltage control loop.

Figure 3B:
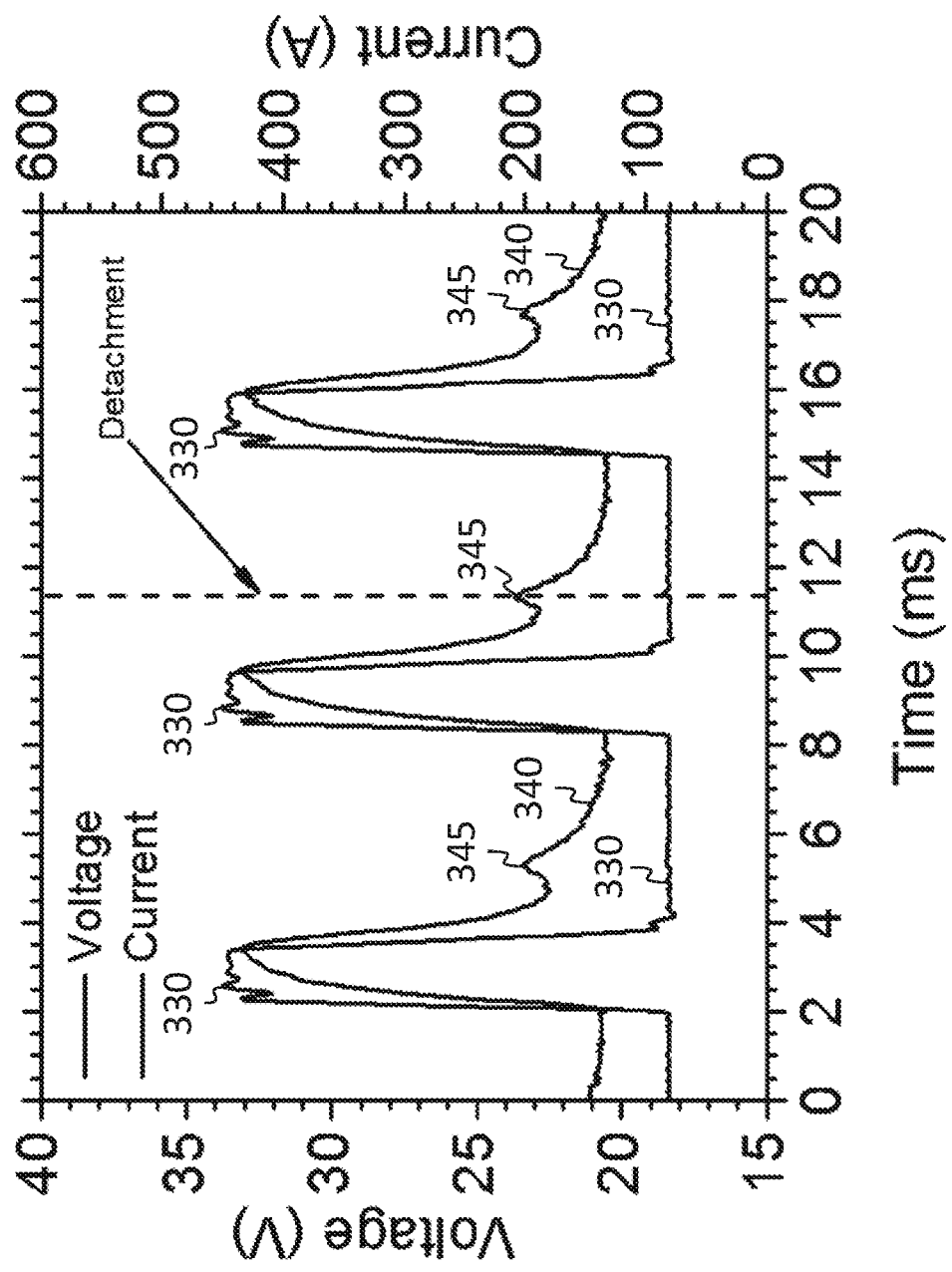
FIG. 3B is a graph of welding waveforms, according to an embodiment of the present invention.

Referring to FIG. 3B in another embodiment, the frequency is not set by the operator and instead is controlled dynamically by detection of droplet detachment (i.e., the detachment, in droplet spray transfer mode, of fine molten metal droplets) from the tip of the molten wire. FIG. 3B is a graph of the arc current (in a first curve 330) and of the arc voltage (in a second curve 340) as a function of time. During each low current portion of the waveform, the voltage telemetry signal may steadily decrease except for a small, transient increase 345 which may indicate wire droplet detachment. For example, during droplet detachment the voltage may increase by approximately 1 V, for approximately 1 ms, and then decrease again. Droplet detachment may be more readily detectable when the frequency of the square wave current control signal is between about 80 Hz and about 200 Hz. At higher frequencies (e.g., at about 280 Hz, as in the operating mode illustrated in FIG. 3A), droplet detection may not be readily detectable in the arc voltage. In operating modes in which droplet detachment is readily detectable in the arc voltage (e.g., at current control signal frequencies in which droplet detachment results in a significant transient voltage increase), the current control signal frequency, instead of being constant, may be controlled so that the square wave current control signal is synchronized, as described in further detail below, with droplet detachment, and so that one droplet detaches during each cycle of the square wave current control signal.

In one embodiment, the control board implements a voltage control loop that receives the digital voltage telemetry signal, calculates an average arc voltage, compares the sensed average arc voltage to an arc voltage setpoint, and generates a feedback control signal accordingly. The voltage control loop is implemented in the FPGA (which may be programmed with bit file that results from compiling a corresponding VHDL program). The FPGA reads voltage samples from the analog to digital converter, calculates an average voltage, subtracts the arc voltage setpoint to form an error signal, and generates a feedback signal from the error signal. The feedback signal is then used to set the duty cycle of a digital current control signal, which is a precursor to the analog current control signal provided to the control input of the current supply. Like the analog current control signal, the digital current control signal is a square wave with a frequency that is either set by the operator or adjusted based on droplet detachment detection and a duty cycle that varies under the control of the voltage control loop. The digital current control signal is sent to a digital to analog converter, the output of which forms the analog current control signal (or simply "current control signal"), that is fed to the control input of, and controls, the current supply. In some embodiments the adjustment of the duty cycle is made once for each cycle of the control waveform.

The duty cycle of the current control signal is defined as the fraction of a period that the current takes the high current value. It may be expressed as a decimal fraction (e.g., 0.40) or as a percentage (e.g., 40%). For example, if during each cycle of the current control signal the current takes the high value 40% of the time, and the low value 60% of the time, the duty cycle is 0.40 or, equivalently, 40%.

In one embodiment, the digital current control signal is generated by estimating the average arc voltage, forming a feedback signal that is a function of the average arc voltage, and using the feedback signal to set the "on" time (i.e., the time during which the square wave current control signal takes the high value). The remainder of each cycle of the current control signal, during which the arc current is at the low value, may be referred to as the "off" time. To estimate the average arc voltage, the FPGA obtains a stream of samples from an analog to digital converter sampling the arc voltage telemetry signal repeatedly. In some embodiments the analog to digital converter is operated in a free-running mode, or in a quasi-free-running mode in which it is sent a new command to begin another conversion by the FPGA as soon as it completes a conversion.

Each time the FPGA receives a new arc voltage telemetry sample from the analog to digital converter, the FPGA handles the sample in one of three ways. If the sample is received during a "dead time" interval, then it is discarded (e.g., not processed further, and eventually overwritten) by the FPGA. A first dead time interval may be defined to be a time interval at the beginning of each high current portion of the current control signal. Discarding samples taken during this dead time may reduce the effect on the calculated average arc voltage of a transient peak in the voltage, and a delay in the rise of the current, at the beginning of each of the high current portions of each cycle. A second dead time interval may be defined to be a time interval at the beginning of each low current portion of the current control signal. Discarding samples taken during this dead time may reduce the effect on the calculated average arc voltage of a transient dip in the voltage, and a delay in the fall of the current, at the beginning of each of the low current portions of each cycle.

Otherwise, if the sample is not received during a "dead time" interval, the sample is stored in (i) a first arc voltage telemetry register, for holding the most recent high current arc voltage telemetry, if the sample is received during a high current portion of the current control signal, or (ii) a second arc voltage telemetry register for holding the most recent low current arc voltage telemetry, if the sample is received during a low current portion of the current control signal.

A subsequent processing block in the FPGA then executes each time either of these two registers is updated. This processing block calculates the weighted average V* as $$V^* = V_H \times D + V_L \times (1-D),$$

where $V_H$ is the value stored in the first arc voltage telemetry register, $V_L$ is the value stored in the second arc voltage telemetry register, and D is the duty cycle. The processing block then shifts V* into the first position of a queue of depth n, e.g., a queue with a depth of four values (so that the introduction of the new value causes the previous fourth value to be overwritten by the previous third value) and takes the average of all of the (e.g., four) values in the queue to calculate an average arc voltage (i.e., an average arc voltage that is calculated as a moving average of the previous n (e.g., 4) values of V*).

The average arc voltage is subtracted from an arc voltage setpoint or "command" to form an error signal, and the error signal is multiplied by a gain coefficient to form a feedback term which is then added to a running total, i.e., numerically integrated, forming a tentative "on time". As a result of this integration, the voltage controller may have a gain inversely proportional to frequency, over a range of frequencies.

The tentative on time determines, within set limits, the on time of the current control signal. The tentative on time is compared to a minimum on time and to a maximum on time. If it is less than the minimum on time the on time is set to the minimum on time; if it is greater than the maximum on time the on time is set to the maximum on time. If the tentative on time is neither less than the minimum on time nor greater than the maximum on time, the on time is set to the tentative on time. The minimum and maximum on time may be set by the operator, subject to system-provided default values and constraints (e.g., the operator may be prevented from setting the on time to be less than a system-defined minimum value). The system default minimum on time may be increased (but not decreased) by the operator, and the maximum on time may be decreased (but not increased) by the operator. In some embodiments, the maximum on time is the period of the square wave current control signal minus a specified internal (i.e., system-defined) value which cannot be changed by an operator.

The FPGA then generates the current control signal by commanding a digital to analog converter to output a voltage corresponding to the high current during a number of clock cycles corresponding to the on time, and then commanding the digital to analog converter to output a voltage corresponding to the low current during the remainder of a cycle of the current control signal. The FPGA may determine that a cycle of the current control signal has been completed when a corresponding number of clock cycles have elapsed.

Figure 4A:
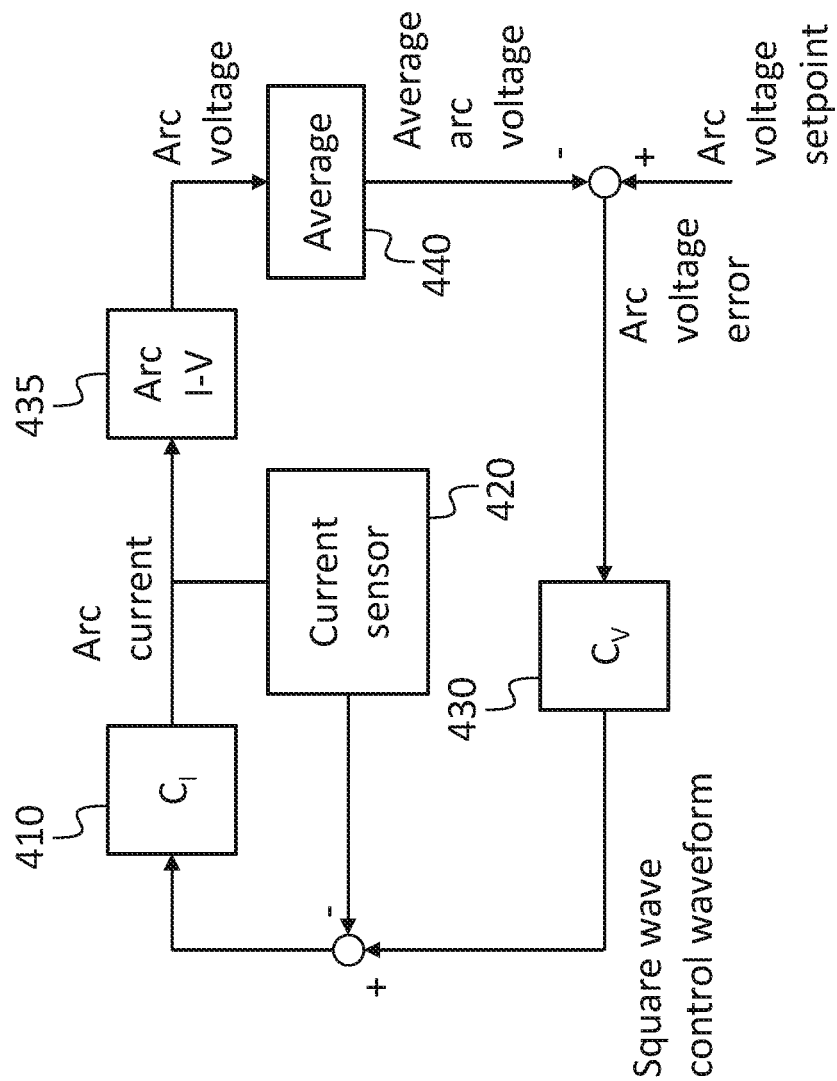
FIG. 4A is a control diagram of current and voltage control loops, according to an embodiment of the present invention.

Referring to FIG. 4A, in one embodiment a control diagram for the voltage and current loops includes a current controller 410 ("$C_I$"), a current sensor 420, and a voltage controller 430 ("$C_V$"). As is explained above, the current controller may be a part of the current source, and the voltage controller may include circuitry in the FPGA 260, as well as portions of the I/O circuits 265. The arc current flowing through the arc produces a voltage drop across the arc as a result of the I-V characteristic of the arc (represented by I-V block 435). The arc voltage is sensed to form arc voltage telemetry, which is averaged in an averaging block 440 to form an average arc voltage. The voltage controller 430 receives an arc voltage error signal formed by subtracting the average arc voltage from the arc voltage setpoint, and generates a square wave current control signal (or "square wave control waveform"). As described above, the square wave current control signal may have a constant (e.g., operator-selected) frequency, and a duty cycle that is adjusted, by the voltage controller 430, to minimize the arc voltage error signal. The current controller 410 receives a control voltage and produces an arc current that is sensed by the current sensor 420, which produces a current telemetry signal (e.g., a voltage that is proportional to the current). The current telemetry signal is subtracted from the current control signal received from the voltage controller 430, to form an error signal that is used as input by the current controller in setting the arc current. In one embodiment, the current controller integrates the error signal and multiplies by a gain to determine the arc current to be supplied. The unity-gain frequency, or "crossover frequency" of the current control loop may be about 10 kHz, or between 1 kHz and 15 kHz. In some embodiments the crossover frequency is greater than 10 Hz, e.g., the crossover frequency is 8 kHz.

Figure 4B:
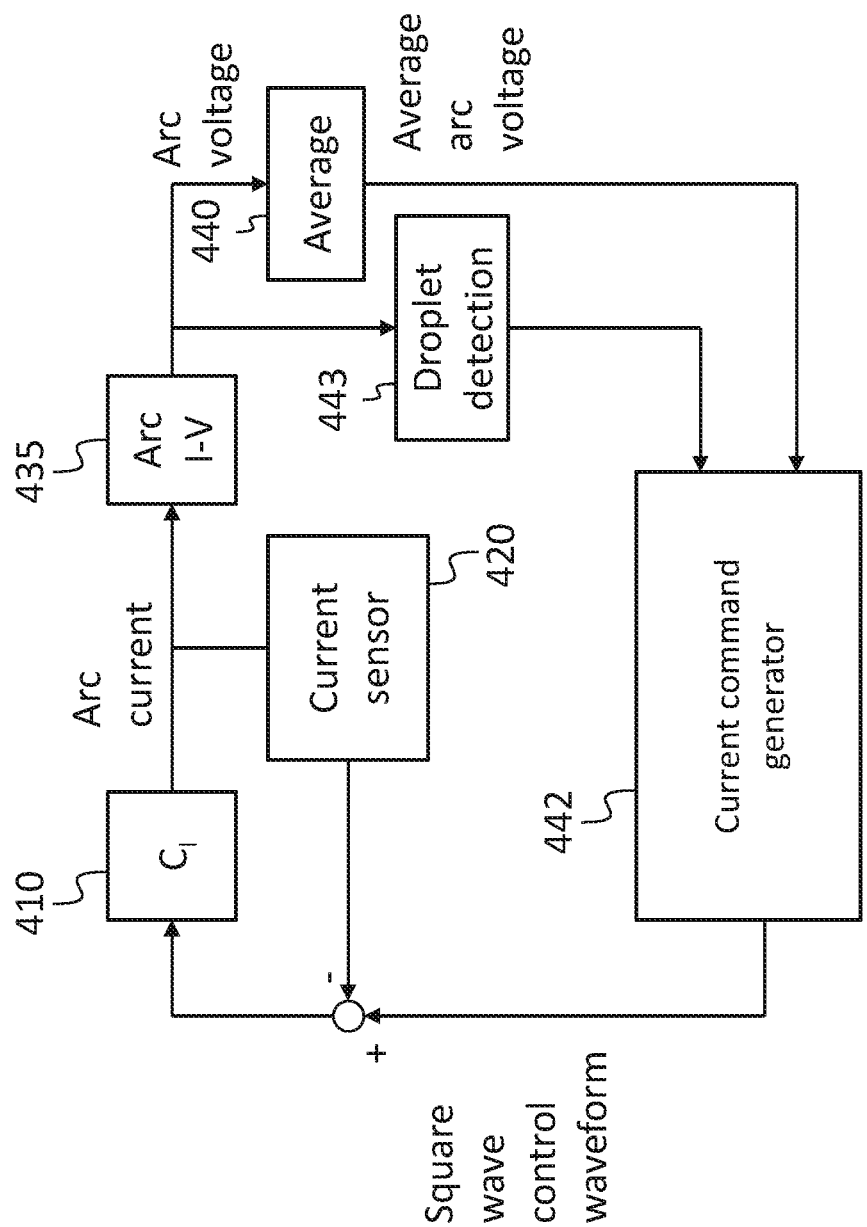
FIG. 4B is a control diagram incorporating droplet detection, according to an embodiment of the present invention.

Referring to FIG. 4B, in some embodiments, as mentioned above, instead of the square wave current control signal having a constant frequency, the frequency may be adjusted to match the frequency at which droplets (i.e., fine molten metal droplets, in droplet spray transfer mode) detach from the end of the feed wire. In general, this may be accomplished by adjusting the frequency and duty cycle of the square wave current control signal so that the both arc voltage control and droplet synchronization are concurrently achieved, i.e., so that (i) the average arc voltage remains substantially equal to the arc voltage setpoint and (ii) droplet detachment occurs once per cycle of the square wave current control signal, and it occurs within the low-current portions of the waveform. For example, a current command generator 442 may receive a signal from a droplet detection circuit 443 each time droplet detachment is detected, and it may receive an average arc voltage signal from the averaging block 440. The current command generator 442 may then generate the square wave current control signal, based on these inputs, to achieve both arc voltage control and droplet synchronization. The current command generator 442 may be a digital circuit, implemented, for example, in the FPGA 260. The droplet detection circuit may be an analog circuit and/or a digital circuit (e.g., a portion of the FPGA 260).

For example, the current command generator 442 may lock the phase of the square wave current control signal to the droplet detection signals. To accomplish this, the current command generator 442 may generate, internally, a phase error signal (the phase error being a measure of the extent to which droplet detachment occurs too early or too late within each cycle of the square wave current control signal), and it may filter the phase error signal with a suitable loop filter. The output of the loop filter may then determine the period of the square wave current control signal. For example, if the droplet detection signal occurs too early in the low-current portions of the waveform, the output of the loop filter may be reduced, so that the next falling edge of the square wave current control signal occurs earlier than it would otherwise.

The current command generator 442 may also generate an internal arc voltage error signal by subtracting the average arc voltage from the arc voltage setpoint, and it may adjust the duty cycle, as described above in the context of FIG. 4A, so that the average arc voltage is substantially equal to the arc voltage setpoint.

Figure 4C:
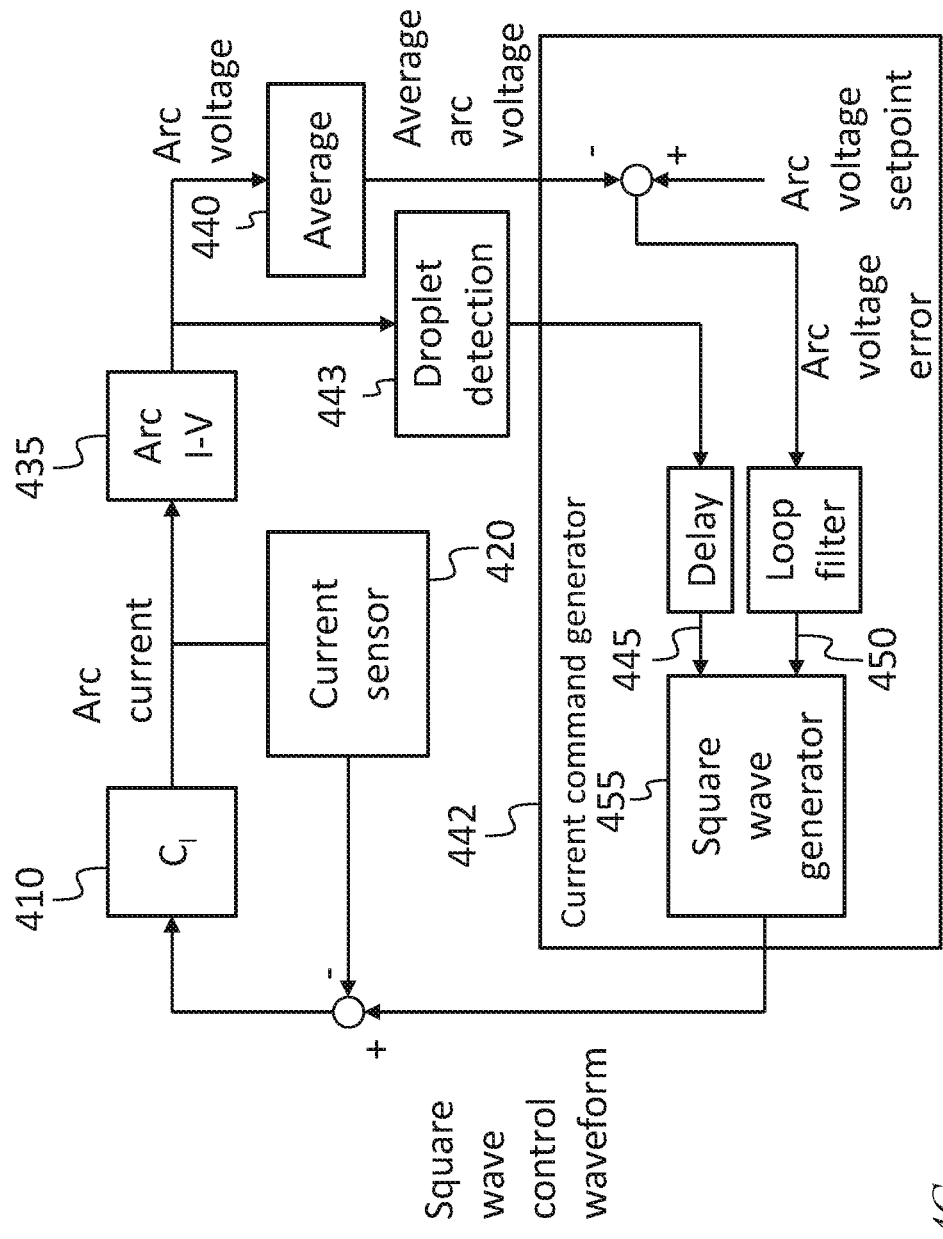
FIG. 4C is a control diagram incorporating droplet detection, according to an embodiment of the present invention.

Referring to FIG. 4C, in one embodiment, the current command generator 442 includes a delay circuit, a loop filter, and a square wave generator 455, having a first input 445 and a second input 450. The current command generator 442 forms the arc voltage error signal, which is filtered by the loop filter and fed to the second input of the square wave generator 455; the length of the high-current portions of the waveform is determined by the value at the second input 450.

Each time droplet detachment is detected, by the droplet detection circuit 443, the droplet detachment detection signal is delayed (by the delay circuit, which may be a counter or a shift register) and then fed to the first input 445; receipt of this delayed signal causes the square wave generator 455 to transition to the high-current portion of the waveform. In this manner, the frequency and phase of the square wave signal are locked to the droplet detection signal. The delay provides time, upon detection of the droplet detachment, to allow the droplet to fall into the weld puddle before the system transitions to the high current value. In this embodiment, the arc current is a square wave that may have the highest possible frequency, for a given wire feed speed, for which one droplet transitions to the weld puddle during each low current portion of the waveform. In some embodiments, if droplet detachment is not detected within some time interval (e.g., 20 ms) after the second dead time interval, the current transitions to the high current value without the system waiting further to detect droplet detachment. The detection of droplet detachment and control of the subsequent transition to the high current value may be performed, for example, by a portion of the FPGA 260.

In this embodiment the current command generator 442 acts as a voltage controller and also provides control of the duration of the low current portion of the current control signal. In operation, the duty cycle of the square wave may be (e.g., as illustrated in FIG. 3B) significantly less than 50%. In this case, adjusting the duration of the high current portion affects primarily the duty cycle and has relatively little effect on the frequency, and adjusting the duration of the low current portion affects primarily the frequency, and has relatively little effect on the duty cycle. In some embodiments, at startup, a relatively low initial frequency (or a relatively long, e.g., 10 ms initial duration of the low current portion) is used, to avoid operating at an initial frequency that is too high (or with a low current portion that is too short) for droplet detachment detection.

Figure 5:
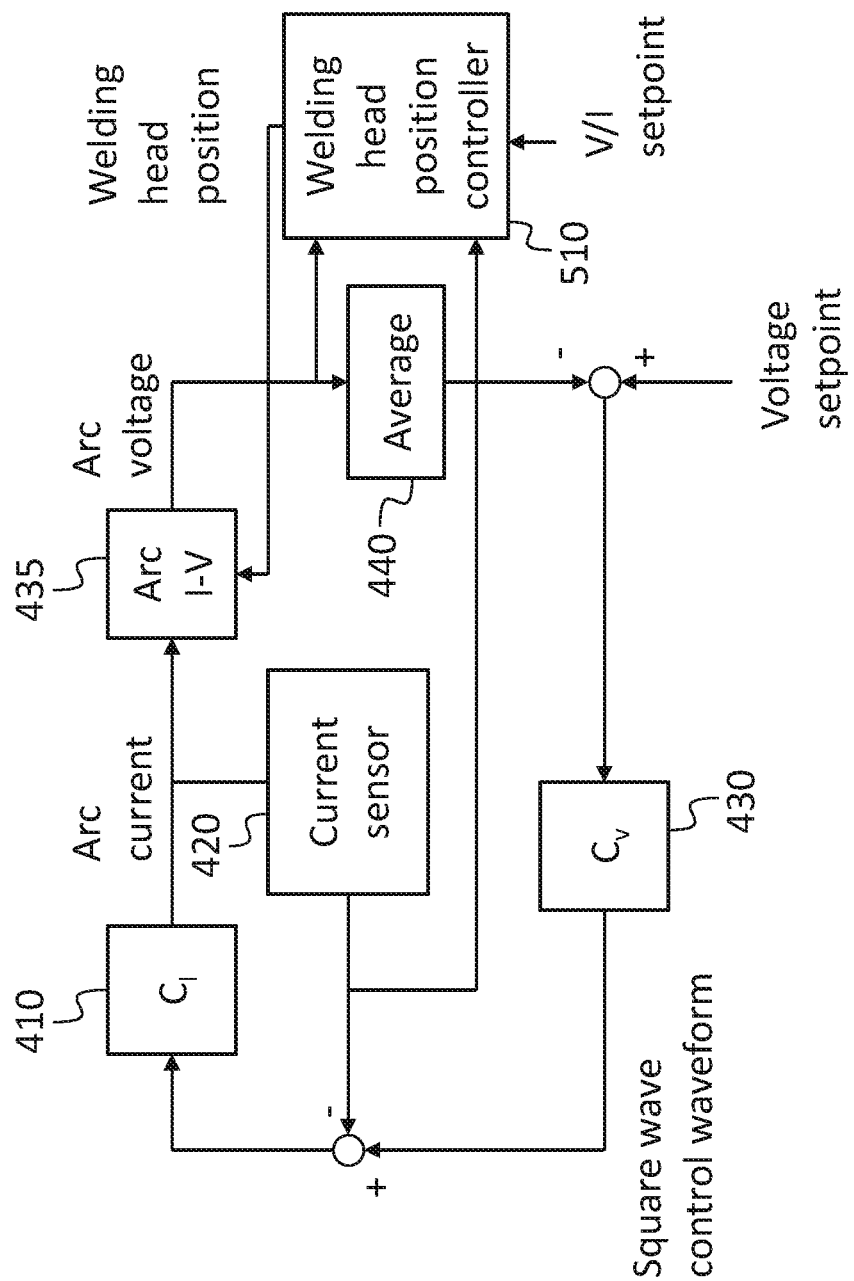
FIG. 5 is a control diagram of current, voltage, and welding head position control loops, according to an embodiment of the present invention.

Referring to FIG. 5, a welding head position loop may control the position of the welding head along the "automatic voltage control" (AVC) axis. The AVC axis may correspond to motion of the welding head in a direction perpendicular to the welding direction and to the surface of the work piece, so that this motion results in an increase or a decrease of the distance between the welding head and the weld puddle. Although in some embodiments this axis is not used for voltage control, it may be referred to as the automatic voltage control axis, because the same axis may be used for voltage control in a gas tungsten arc welding (GTAW) system. In the welding head position controller 510, an arc voltage characteristic is divided by an arc current characteristic to form a ratio referred to herein as the "average arc impedance". The arc voltage characteristic may be the difference between the arc voltage during a high current portion of the current control signal and the arc voltage during a low current portion of the current control signal; the arc current characteristic may be the difference between the arc current during a high current portion of the current control signal and the arc current during a low current portion of the current control signal. The average arc impedance is subtracted from a setpoint value for the average arc impedance, and the difference is used by the welding head position controller 510 to generate a control signal for the AVC axis servomotor. If the arc length is substantially constant (as a result of the voltage and current control provided by the voltage and current control loops) then motion along the AVC axis of the welding head may affect the amount of "stickout", i.e., the extent to which the wire extends out of the contact tip. Stickout may affect both the weld quality and the average arc impedance; as a result, the welding head position controller 510 may control the welding head position so that the average arc impedance is one corresponding to a stickout that results in good weld quality. The welding head position loop may be useful, for example, when performing a circumferential weld on a pipe that is slightly out of round; in this case the welding head position loop may cause the welding head to maintain a constant distance from the weld. The head position control loop may be a relatively slow loop and it may be executed in the CPU.

Figure 6:
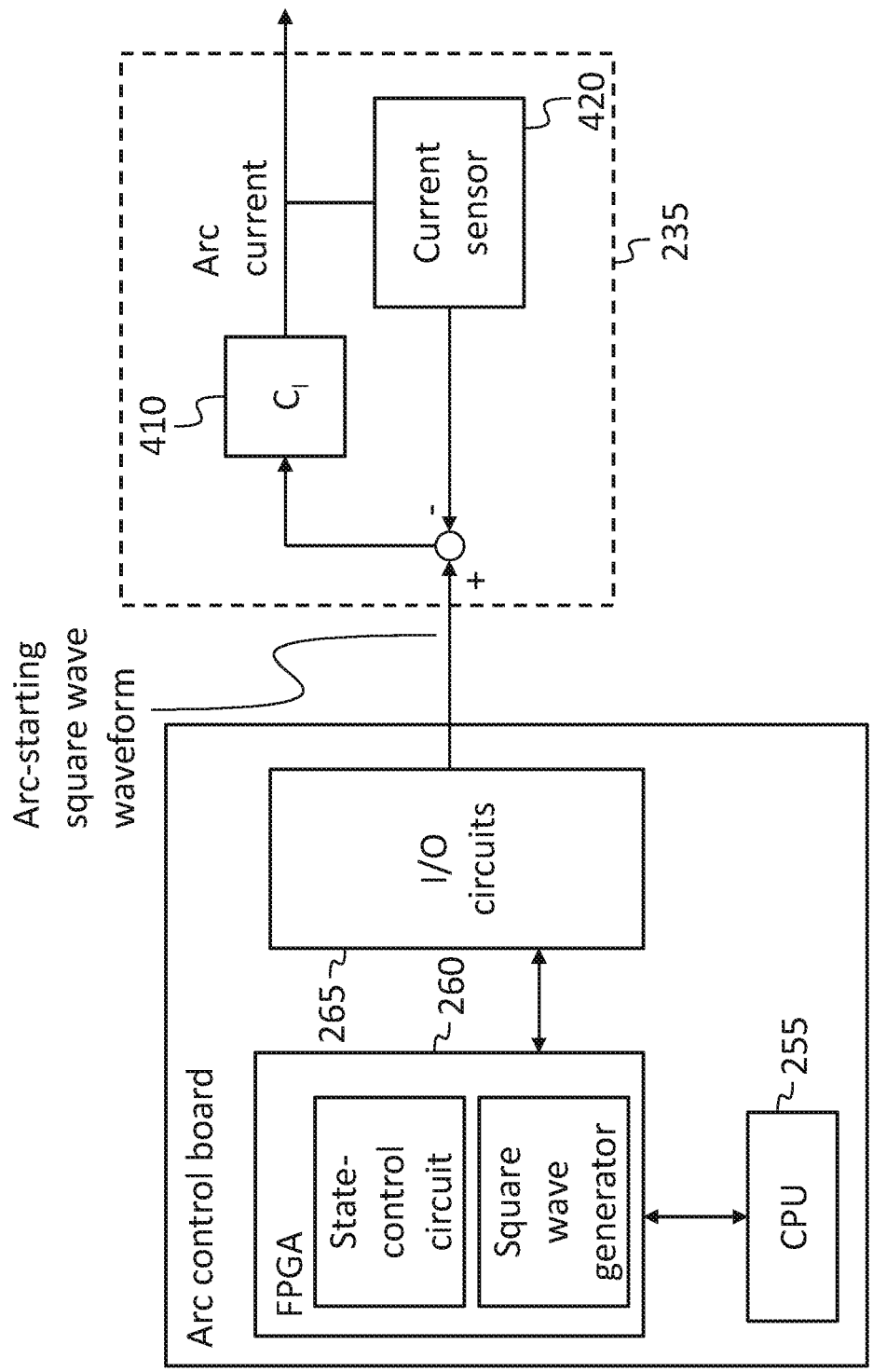
FIG. 6 is a control diagram of a current control loop in an arc-starting state, according to an embodiment of the present invention.

If the voltage control loop is active at startup, transient changes (such as changes in the stickout, the arc length, and the weld puddle size) occurring at startup may interact with the control loop. This may result in the system taking longer to reach a condition of stable welding parameters, or even to become unstable. Referring to FIG. 6, in one embodiment the welder is capable of starting an arc in an arc-starting state, in which the voltage-control loop is disabled. Instead of receiving a square wave control signal having a duty cycle determined by the voltage control loop, in the arc starting state the current supply receives a constant duty cycle waveform (e.g., generated by a square wave generator in the FPGA) with a duty cycle selected to provide acceptable performance during startup. The system may remain in the arc starting state during an interval that is programmable by the operator, that may be selected with the goal of allowing the arc length to stabilize and a weld puddle of suitable size to form. Once a stable arc and a suitable weld puddle are established, the voltage control loop is enabled. Control of whether the welder is in an arc-starting state or in an operating state may be performed by a state-control circuit in the FPGA.

The CPU may provide an interface for an operator to monitor and control operation of the welder. The CPU may implement a graphical user interface on the display. For example, the CPU may display to the operator, on the display, current system settings, and, during operation, real time values of operating parameters such as arc voltage, current, wire feed speed, and welding head position. The user interface may enable the operator to set various system parameters, such as the high current dead time, low current dead time, minimum high current time, minimum low current time, wire feed speed, the target average arc impedance, and the like. For some parameters, the system software or firmware may constrain the values an operator may assign to a parameter, to reduce the risk that the operator will inadvertently enter a value that results in poor operation. For example, the high current time may be constrained to be at least 180 microseconds.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an arc welding system have been specifically described and illustrated herein, many modifications and variations will be apparent to those skilled in the art. Accordingly, it is to be understood that an arc welding system constructed according to principles of this invention may be embodied other than as specifically described herein. The invention is also defined in the following claims, and equivalents thereof.

What is claimed is:

1. An arc welding system for forming and maintaining a welding arc, the system comprising:

a current controller for performing closed-loop control of an arc current, the current controller having a crossover frequency of at least 10 Hz;

a voltage controller for performing, in an operating state of the system, closed-loop control of an arc voltage by measuring the arc voltage with an analog-to-digital converter, and providing, to the current controller, a square wave current control signal having a variable duty cycle, the variable duty cycle being based on the measured arc voltage;

a welding head; and a welding head position controller for:
  calculating a ratio of
    an arc voltage characteristic and
    an arc current characteristic, and
  controlling, based on the ratio, a position of the welding head with respect to a weld puddle.

2. The system of claim 1, further comprising a droplet detection circuit for detecting a change, in the arc voltage, corresponding to droplet detachment from a feed wire,
  wherein the voltage controller comprises a square wave generator to dynamically adjust a low current portion of the square wave current control signal, in response to the change in the arc voltage, to achieve one droplet per cycle of the square wave current control signal.

3. The system of claim 1, wherein the square wave current control signal has a constant frequency.

4. The system of claim 1, wherein the current controller has a crossover frequency of at least 8 kHz.

5. The system of claim 1, wherein the voltage controller has a gain inversely proportional to frequency, over a range of frequencies.

6. The system of claim 1, further comprising a state-control circuit for disabling the voltage controller in an arc-starting state of the system.

7. A method for operating the arc welding system of claim 1, the method comprising:
  sensing an arc current and controlling the arc current to follow, with a current control loop, a current control signal; and
  sensing an average arc voltage and controlling, with a voltage control loop, the average arc voltage to equal a setpoint value,
  the controlling of the average arc voltage comprising:
    providing, to the current control loop, as the current control signal, the square wave.

8. The method of claim 7, further comprising sensing wire droplet detachment from a feed wire and controlling, by this detection, the duration of low current portions of the square wave to achieve one droplet per cycle of the square wave.

9. The method of claim 7, wherein the square wave has a constant frequency.

10. The method of claim 7, further comprising, during a first interval of time, before controlling, with the voltage control loop, the average arc voltage to equal a setpoint value:
  controlling the arc current to follow a square wave current control signal having a constant frequency and a constant duty cycle.

11. An arc welding system for forming and maintaining a welding arc, the system comprising:
  a current source for providing and controlling an arc current; and
  a closed-loop voltage controller for:
    measuring at least two values of an arc voltage;
    calculating, from the measured values, an average arc voltage; and
    providing, at a voltage controller output, a square wave current control signal,
  the voltage controller output being connected, in an operating state, to a control input of the current source,
  the square wave current control signal having a variable duty cycle, the variable duty cycle based on the average arc voltage, each cycle of the square wave having a high current portion and a low current portion;
  wherein the measuring of at least two values of the arc voltage comprises sampling the arc voltage during a high current portion and sampling the arc voltage during a low current portion, and
  wherein the calculating of the average arc voltage comprises digitally calculating an average of a plurality of first voltage values V*, each first voltage value being calculated according to:

$$V^* = V_H \times D + V_L \times (1-D),$$

wherein $V_H$ is a voltage sampled during a high current portion, $V_L$ is a voltage sampled during a low current portion, and D is the duty cycle.

12. The system of claim 11, wherein the variable duty cycle is further based on a change in the arc voltage corresponding to droplet detachment from a feed wire, and wherein the square wave current control signal has a frequency based on the average arc voltage and on the change in the arc voltage corresponding to droplet detachment from the feed wire.

13. The system of claim 11, wherein the square wave current control signal has a constant frequency.

14. The system of claim 11, wherein, in an arc-starting state, the voltage controller is disconnected from the control input of the current source, and a square wave generator for generating a constant frequency, constant duty cycle square wave is connected to the control input of the current source.

15. The system of claim 11, wherein the measuring of at least two values of the arc voltage comprises:
  receiving a voltage sample value from an analog to digital converter;
  discarding the voltage sample value if a sampling time associated with the voltage sample value is within a dead time interval of a plurality of dead time intervals in each cycle of the square wave; and
  storing the value if a sampling time associated with the voltage sample is not within any dead time interval of the plurality of dead time intervals in each cycle of the square wave.

16. The system of claim 15, wherein the plurality of dead time intervals includes:
  a first time interval beginning at the transition
    from a low current portion
    to a high current portion immediately following the low current portion; and
  a second time interval beginning at the transition
    from a high current portion
    to a low current portion immediately following the low current portion.

17. The system of claim 16, wherein the providing, at the voltage controller output, of a square wave current control signal comprises calculating a voltage error signal as a difference between the average arc voltage and a voltage setpoint value.

18. The system of claim 17, wherein the providing, at the voltage controller output, of a square wave current control signal further comprises:
  multiplying the error signal by a gain coefficient to form a scaled error signal; and integrating the scaled error signal to form a tentative on time.

19. The system of claim 18, wherein the providing, at the voltage controller output, of a square wave current control signal further comprises:
   setting an on time equal to a maximum on time if the tentative on time is greater than the maximum on time;
   setting the on time equal to a minimum on time if the tentative on time is less than the minimum on time; and
   setting the on time equal to the tentative on time if the tentative on time is:
      not less than the minimum on time; and
      not greater than the maximum on time.

20. The system of claim 19, wherein the minimum on time is the greater of:
   a specified internal value which cannot be changed by an operator, and
   a user-selectable value.

21. The system of claim 19, wherein the maximum on time is 1/f minus a specified internal value which cannot be changed by an operator, wherein f is a frequency of the square wave current control signal.

22. The system of claim 19, wherein the providing, at the voltage controller output, of a square wave current control signal further comprises:
   providing, at the voltage controller output, during a third time interval, a digital value corresponding to a first current, and
   providing, at the voltage controller output, during a fourth time interval immediately following the third time interval, a digital value corresponding to a second current less than the first current,
   wherein:
      the length of the third time interval is equal to the on time; and
      the sum of:
         the length of the third time interval, and
         the length of the fourth time interval
         is equal to the reciprocal of a frequency of the square wave current control signal.

* * * * *